US011415065B2

(12) United States Patent
Terwilliger et al.

(10) Patent No.: US 11,415,065 B2
(45) Date of Patent: Aug. 16, 2022

(54) MATERIAL FATIGUE IMPROVEMENT FOR HYBRID PROPULSION SYSTEMS

(71) Applicant: Raytheon Technologies Corporation, Farmington, CT (US)

(72) Inventors: Neil Terwilliger, Meriden, CT (US); Marc J. Muldoon, Marlborough, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 57 days.

(21) Appl. No.: 16/912,110

(22) Filed: Jun. 25, 2020

(65) Prior Publication Data

US 2021/0047969 A1    Feb. 18, 2021

Related U.S. Application Data

(60) Provisional application No. 62/885,604, filed on Aug. 12, 2019.

(51) Int. Cl.
*F02C 7/36* (2006.01)
*F02C 6/00* (2006.01)
(Continued)

(52) U.S. Cl.
CPC ............... *F02C 7/36* (2013.01); *F02C 3/04* (2013.01); *F02C 6/00* (2013.01); *F02C 7/32* (2013.01);
(Continued)

(58) Field of Classification Search
CPC ...... F02C 7/20; F02C 7/32; F02C 7/36; F02C 3/04; F02C 6/00; F02C 6/14; F01D 15/10;
(Continued)

(56) References Cited

U.S. PATENT DOCUMENTS 7,802,757 B2   9/2010 Dooley et al.
8,543,262 B1   9/2013 Gehrke et al.
(Continued)

FOREIGN PATENT DOCUMENTS

EP   3421760 A1   1/2019
EP   3633160 A2   4/2020

OTHER PUBLICATIONS

European Search Report for European Application No. 20190757.3, International Filing Date Aug. 12, 2020, dated Jan. 18, 2021,7 pages.

*Primary Examiner* — William H Rodriguez
(74) *Attorney, Agent, or Firm* — Cantor Colburn LLP

(57) ABSTRACT

Hybrid electric propulsion systems are described. The hybrid electric propulsion systems include a gas turbine engine including a low speed spool and a high speed spool, the low speed spool including a low pressure compressor and a low pressure turbine, and the high speed spool including a high pressure compressor and a high pressure turbine, a mechanical power transmission configured to at least one of extract power from and supply power to at least one of the low speed spool and the high speed spool, an electric motor configured to augment rotational power of at least one of the low speed spool and the high speed spool, and a controller operable to control a power augmentation of at least one of the low speed spool and the high speed spool during an operational stress state of operation of the gas turbine engine.

16 Claims, 6 Drawing Sheets

(51) Int. Cl.
*F02C 7/32* (2006.01)
*F02K 5/00* (2006.01)
*F02C 3/04* (2006.01)
F02C 7/20 (2006.01)
F01D 15/10 (2006.01)
B64D 27/02 (2006.01)
F02C 6/14 (2006.01)

(52) U.S. Cl.
CPC .......... *F02K 5/00* (2013.01); *B64D 2027/026* (2013.01); *F01D 15/10* (2013.01); *F02C 6/14* (2013.01); *F02C 7/20* (2013.01)

(58) Field of Classification Search
CPC .. B64D 2027/026; F05D 2260/40; F02K 5/00
See application file for complete search history.

(56) References Cited

U.S. PATENT DOCUMENTS

| | | | |
|---|---|---|---|
| 8,857,191 B2 | 10/2014 | Hyde et al. | |
| 8,957,539 B1 | 2/2015 | Ralston | |
| 10,196,923 B2 | 2/2019 | Thomassin | |
| 10,907,494 B2 * | 2/2021 | Long | B64D 27/10 |
| 10,934,972 B2 * | 3/2021 | Hrach | F02C 3/04 |
| 11,022,042 B2 * | 6/2021 | Munevar | F02K 3/06 |
| 2010/0083632 A1 | 4/2010 | Foster et al. | |
| 2017/0187311 A1 | 6/2017 | French et al. | |
| 2017/0226934 A1 * | 8/2017 | Robie | F02C 7/36 |
| 2018/0002025 A1 | 1/2018 | Lents et al. | |
| 2018/0003072 A1 * | 1/2018 | Lents | F02C 7/36 |

* cited by examiner

MATERIAL FATIGUE IMPROVEMENT FOR HYBRID PROPULSION SYSTEMS

CROSS REFERENCE TO RELATED APPLICATIONS

This application claims the benefit of an earlier filing date from U.S. Provisional Application Ser. No. 62/885,604, filed Aug. 12, 2019, the entire disclosure of which is incorporated herein by reference.

BACKGROUND

The subject matter disclosed herein generally relates to rotating machinery and, more particularly, to a method and an apparatus for operability control for hybrid electric propulsion.

Gas turbine engines typically include multiple spools with a compressor section and a turbine section on opposite sides of a combustor section in an engine core. As an example, in a two-spool design, fuel in air that has been compressed by a low pressure compressor (LPC) followed by a high pressure compressor (HPC) of the compressor section is combusted. The combustion takes place in the combustor section to create heated gases with increased pressure and density. The heated gases are used to rotate a high pressure turbine (HPT) followed by a low pressure turbine (LPT) in the turbine section that are used to produce thrust or power. Air flows through the compressor and turbine sections differ at various operating conditions of an engine, with more air flow being required at higher output levels and vice versa. Aerodynamic interaction between the LPC and HPC with respect to speed can impact compressor stability in the compressor section.

BRIEF DESCRIPTION

According to some embodiments, hybrid electric propulsion systems are provided. The hybrid electric propulsion systems include a gas turbine engine including a low speed spool and a high speed spool, the low speed spool including a low pressure compressor and a low pressure turbine, and the high speed spool including a high pressure compressor and a high pressure turbine, a mechanical power transmission configured to at least one of extract power from and supply power to at least one of the low speed spool and the high speed spool, an electric motor configured to augment rotational power of at least one of the low speed spool and the high speed spool, and a controller operable to control a power augmentation of at least one of the low speed spool and the high speed spool during an operational stress state of operation of the gas turbine engine.

In addition to one or more of the features described above, or as an alternative, further embodiments may include that the operational stress state includes a peak compression state.

In addition to one or more of the features described above, or as an alternative, further embodiments may include that the peak compression state occurs during a transition from cruise to descent.

In addition to one or more of the features described above, or as an alternative, further embodiments may include that the operational stress state includes a peak tension state.

In addition to one or more of the features described above, or as an alternative, further embodiments may include that the peak tension occurs during takeoff.

In addition to one or more of the features described above, or as an alternative, further embodiments may include that the control of the power augmentation includes extracting power from the low speed spool.

In addition to one or more of the features described above, or as an alternative, further embodiments may include an auxiliary power source configured to store the power extracted from the low speed spool.

In addition to one or more of the features described above, or as an alternative, further embodiments may include that the control of the power augmentation includes adding power to the high speed spool from an auxiliary power source.

In addition to one or more of the features described above, or as an alternative, further embodiments may include that the control of the power augmentation includes transferring power from the low speed spool to the high speed spool.

In addition to one or more of the features described above, or as an alternative, further embodiments may include at least one mechanical power transmission configured add power to the high speed spool.

In addition to one or more of the features described above, or as an alternative, further embodiments may include at least one mechanical power transmission configured to extract power from the low speed spool and add power to the high speed spool.

According to some embodiments, methods for controlling a hybrid electric propulsion system are provided. The methods include monitoring, by a controller, operation of a gas turbine engine, the gas turbine engine including a low speed spool and a high speed spool, the low speed spool including a low pressure compressor and a low pressure turbine, and the high speed spool including a high pressure compressor and a high pressure turbine, determining, but the controller and based on the monitored operation of the gas turbine engine, that an operational stress state is occurring, and controlling, by the controller, a power augmentation of at least one of the low speed spool and the high speed spool during the operational stress state of operation of the gas turbine engine.

In addition to one or more of the features described above, or as an alternative, further embodiments may include that the operational stress state is at least one of a high compression state and a high tension state.

In addition to one or more of the features described above, or as an alternative, further embodiments may include that the controller is configured to at least one of determine the high compression state is occurring during a transition from cruise to descent and determine the high tension state is occurring during takeoff.

In addition to one or more of the features described above, or as an alternative, further embodiments may include that the control of the power augmentation includes extracting power from the low speed spool.

In addition to one or more of the features described above, or as an alternative, further embodiments may include that the power extracted from the low speed spool is stored in an auxiliary power source.

In addition to one or more of the features described above, or as an alternative, further embodiments may include that the control of the power augmentation includes adding power to the high speed spool from an auxiliary power source.

In addition to one or more of the features described above, or as an alternative, further embodiments may include that the control of the power augmentation includes transferring power from the low speed spool to the high speed spool.

In addition to one or more of the features described above, or as an alternative, further embodiments may include at least one mechanical power transmission configured to add power to the high speed spool.

In addition to one or more of the features described above, or as an alternative, further embodiments may include at least one mechanical power transmission configured to extract power from the low speed spool and addition of power to the high speed spool.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
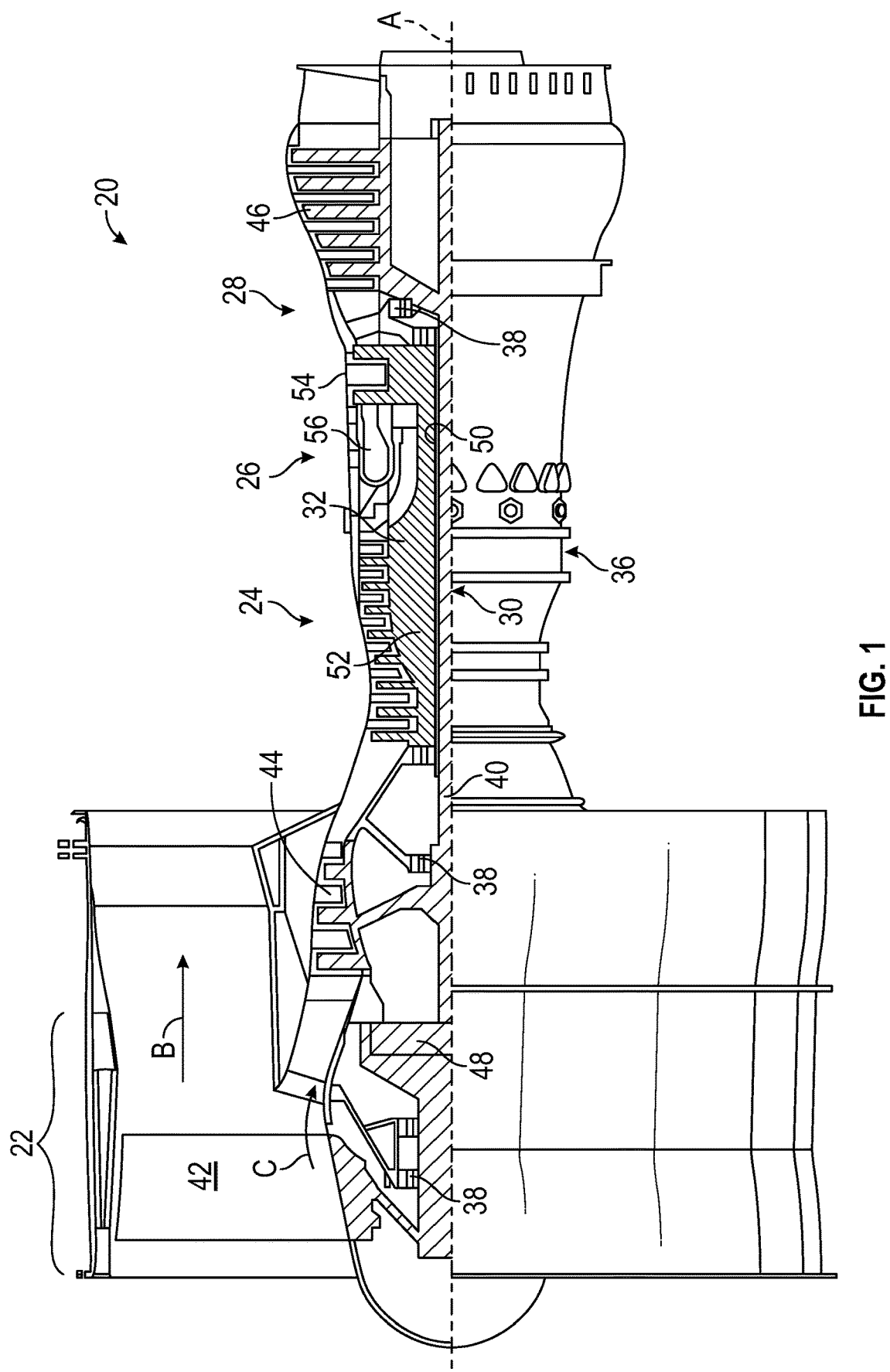
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The illustrative gas turbine engine 20, as shown, includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the bearing systems 38 may be varied as appropriate to the application.

The low speed spool 30 generally includes an inner shaft 40 that interconnects a fan 42 of the fan section 22, a low pressure compressor 44, and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and a high pressure turbine 54. A combustor 56 is arranged between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via the bearing systems 38 about the engine central longitudinal axis A which is collinear with a longitudinal axis thereof.

The core airflow is compressed by the low pressure compressor 44 then the high pressure compressor 52, mixed and burned with fuel in the combustor 56, then expanded over the high pressure turbine 54 and low pressure turbine 46. In some embodiments, stator vanes 45 in the low pressure compressor 44 and stator vanes 55 in the high pressure compressor 52 may be adjustable during operation of the gas turbine engine 20 to support various operating conditions. In other embodiments, the stator vanes 45, 55 may be held in a fixed position. The turbines 46, 54 rotationally drive the respective low speed spool 30 and high speed spool 32 in response to the expansion. It will be appreciated that each of the positions of the fan section 22, the compressor section 24, the combustor section 26, the turbine section 28, and the fan drive gear system 48 may be varied. For example, in some configurations, the gear system 48 may be located aft of the combustor section 26 or even aft of the turbine section 28, and the fan section 22 may be positioned forward or aft of the location of the gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the bypass ratio of the gas turbine engine 20 is greater than about ten (10:1), the fan diameter is significantly larger than that of the low pressure compressor 44, and the low pressure turbine 46 has a pressure ratio that is greater than about five 5:1. A pressure ratio of the low pressure turbine 46 is a pressure measured prior to inlet of the low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

While the example of FIG. 1 illustrates one configuration of a gas turbine engine, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
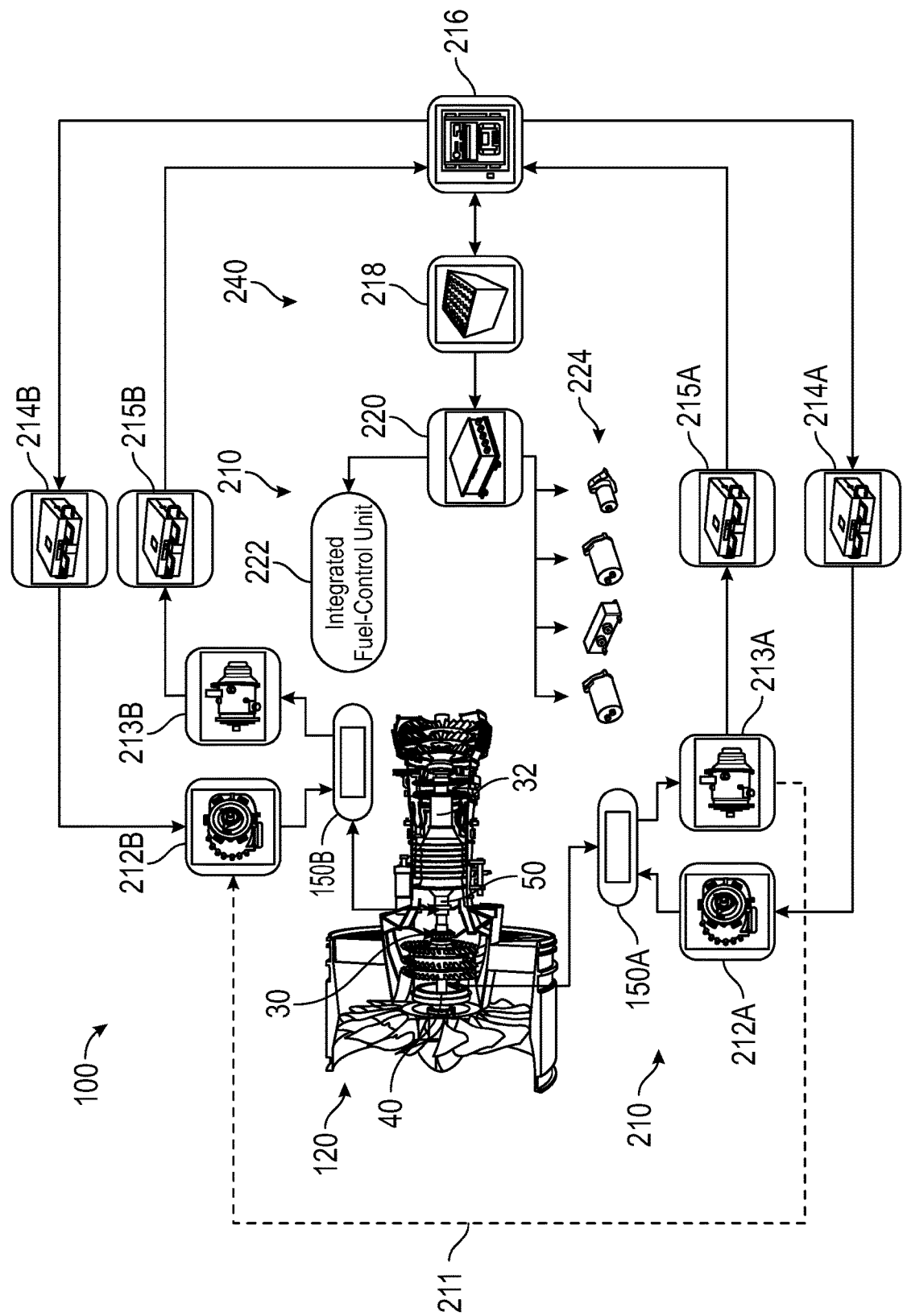
FIG. 2 is a schematic diagram of a hybrid electric propulsion system with physical power flow connections (electrical and mechanical power), in accordance with an embodiment of the disclosure.

FIG. 2 illustrates a hybrid electric propulsion system 100 (also referred to as hybrid gas turbine engine 100) including a gas turbine engine 120 operably coupled to an electrical power system 210 as part of a hybrid electric aircraft. One or more mechanical power transmissions 150A, 150B can be operably coupled between the gas turbine engine 120 and the electrical power system 210. The gas turbine engine 120 can be arranged and/or configured as shown in FIG. 1. In FIG. 2, the gas turbine engine 120 includes one or more spools, such as a low speed spool 30 and a high speed spool 32, each with at least one compressor section and at least one turbine section operably coupled to a shaft (e.g., a low pressure compressor and low pressure turbine coupled to an inner shaft 40 and a high pressure compressor and a high pressure turbine coupled to an outer shaft 50).

The electrical power system 210 can include a first electric motor 212A configured to augment rotational power of the low speed spool 30 and a second electric motor 212B configured to augment rotational power of the high speed spool 32. Although two electric motors 212A, 212B are depicted in FIG. 2, it will be understood that there may be only a single electric motor (e.g., only electric motor 212A) or additional electric motors. The electrical power system 210 can also include a first electric generator 213A configured to convert rotational power of the low speed spool 30 to electric power and a second electric generator 213B configured to convert rotational power of the high speed spool 32 to electric power. Although two electric generators 213A, 213B are depicted in FIG. 2, it will be understood that there may be only a single electric generator (e.g., only electric generator 213A) or additional electric generators. In some embodiments, one or more of the electric motors 212A, 212B can be configured as a motor or a generator depending upon an operational mode or system configuration, and thus one or more of the electric generators 213A, 213B may be omitted.

In the example of FIG. 2, a first mechanical power transmission 150A includes a gearbox operably coupled between the inner shaft 40 and a combination of the first electric motor 212A and the first electric generator 213A. A second mechanical power transmission 150B can include a gearbox operably coupled between the outer shaft 50 and a combination of the second electric motor 212B and second electric generator 213B. In embodiments where the electric motors 212A, 212B are configurable between a motor and generator mode of operation, the mechanical power transmission 150A, 150B can include a clutch or other interfacing element(s).

The electrical power system 210 can also include motor drive electronics 214A, 214B operable to condition current to the electric motors 212A, 212B (e.g., DC-to-AC converters). The electrical power system 210 can also include rectifier electronics 215A, 215B operable to condition current from the electric generators 213A, 213B (e.g., AC-to-DC converters). The motor drive electronics 214A, 214B and rectifier electronics 215A, 215B can interface with an energy storage management system 216 that further interfaces with an energy storage system 218. The energy storage management system 216 can be a bi-directional DC-DC converter that regulates voltages between the energy storage system 218 and the electronics 214A, 214B, 215A, 215B of the electrical power system 210. The energy storage system 218 can include one or more energy storage devices, such as one or more batteries, super capacitors, ultra-capacitors, and the like. The energy storage management system 216 can facilitate various power transfers within the hybrid electric propulsion system 100. For example, power from the first electric generator 213A can be transferred (illustrated at 211) to the second electric motor 212B as a low speed spool-to-high speed spool power transfer. Other examples of power transfers may include a power transfer from the second electric generator 213B to the first electric motor 212A as a high speed spool-to-low speed spool power transfer.

A power conditioning unit 220 and/or other components can be powered by the energy storage system 218. The power conditioning unit 220 can distribute electric power to support actuation and other functions of the gas turbine engine 120. For example, the power conditioning unit 220 can power an integrated fuel control unit 222 to control fuel flow to the gas turbine engine 120. The power conditioning unit 220 can power a plurality of actuators 224 arranged to provide operational control and/or power transfer between the low speed spool 30 and the high speed spool 32. Collectively, any effectors that can change a state of the gas turbine engine 120 and/or the electrical power system 210 may be referred to as hybrid electric system control effectors 240. Examples of the hybrid electric system control effectors 240 can include the electric motors 212A, 212B, electric generators 213A, 213B, integrated fuel control unit 222, actuators 224, and/or other elements as will be appreciated by those of skill in the art.

Figure 3:
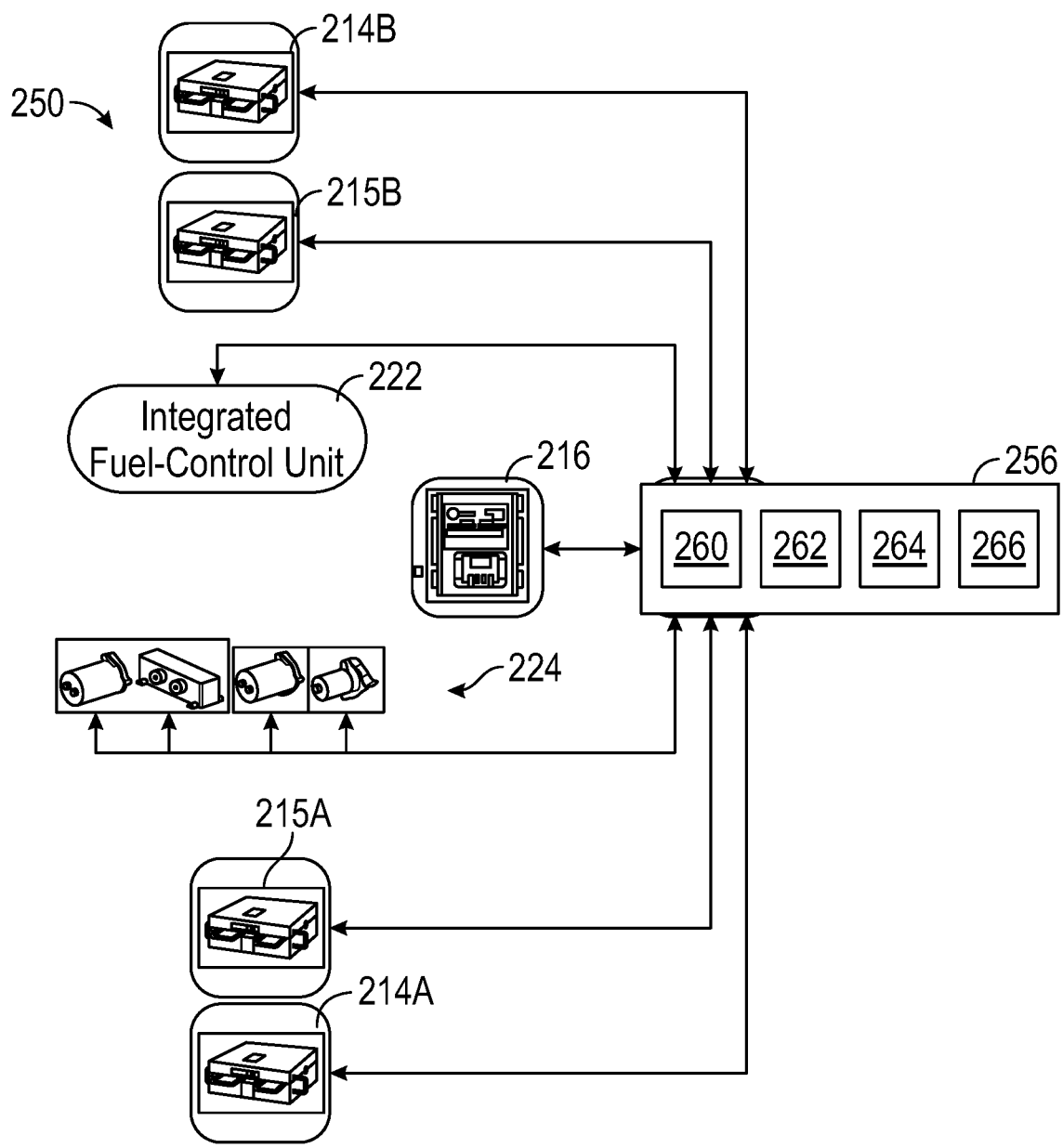
FIG. 3 is a schematic diagram of control signal paths of a hybrid electric propulsion system, in accordance with an embodiment of the disclosure.

FIG. 3 is a schematic diagram of control signal paths 250 of the hybrid electric propulsion system 100 of FIG. 2. A controller 256 can interface with the motor drive electronics 214A, 214B, the rectifier electronics 215A, 215B, the energy storage management system 216, the integrated fuel control unit 222, the actuators 224, and/or other components of the hybrid electric propulsion system 100. In some embodiments, the controller 256 can control and monitor for operating conditions of the gas turbine engine 120 and/or the electrical power system 210, such as related to operational speed or rotational speeds of the low speed spool 30 and the high speed spool 32 (e.g., keep-out zones). For example, the controller 256 can be integrally formed or otherwise in communication with a full authority digital engine control (FADEC) of the gas turbine engine 120. In some embodiments, the controller 256 can include a processing system 260, a memory system 262, and an input/output interface 264. The controller 256 can also include various operational controls, such as, for example, a power transfer control 266 that is configured to control the hybrid electric system control effectors 240 (e.g., actuators 224). In some configurations, as shown, the power transfer control 266 may be integrated or part of the controller 256. In other embodiments, power transfer control may be performed or achieved using a component that is separate from the controller 256.

The processing system 260 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 262 can store data and instructions that are executed by the processing system 260. In some embodiments, the memory system 262 may include random access memory (RAM), read only memory (ROM), and/or other electronic, optical, magnetic, or any other computer readable medium onto which is stored data and algorithms in a non-transitory form. The input/output interface 264 is configured to collect sensor data from the one or more system sensors and interface with various components and subsystems, such as components of the motor drive electronics 214A, 214B, the rectifier electronics 215A, 215B, the energy storage management system 216, the integrated fuel control unit 222, the actuators 224, and/or other components of the hybrid electric propulsion system 100. The controller 256 provides a means for controlling the hybrid electric system control effectors 240 based on a power transfer control 266 that is dynamically updated during operation of the hybrid electric propulsion system 100. The means for controlling the hybrid electric system control effectors 240 can be otherwise subdivided, distributed, or combined with other control elements. One form of such control may be to transfer power (e.g., rotational speed) from one spool to another spool using the actuators 224 or other effectors 240.

The power transfer control 266 can apply control laws and access/update models to determine how to control and transfer power to and from the hybrid electric system control effectors 240. For example, sensed and/or derived parameters related to speed, rotational speed, flow rate, pressure ratios, temperature, thrust, and the like can be used to establish operational schedules and transition limits to maintain efficient operation of the gas turbine engine 120.

In one example embodiment, the power transfer control 266 can control a power transfer between the first electric generator 213A of the low speed spool 30 and the second electric motor 212B of the high speed spool 32 to adjust a current operating condition of the gas turbine engine 120 based on a target operating condition. Such target operation condition can include avoidance of pre-defined keep-out zones of operation (e.g., specific rotational speeds that may be avoided during operation). The power transfer from the low speed spool 30 to the high speed spool 32 shifts the relationship between the speed of the low speed spool 30 and the high speed spool 32 while the power transfer is active. This results in the same speed (e.g., N1) of the low speed spool 30 with a higher speed (e.g., N2) of the high speed spool 32 based on the power transfer.

Gas turbine engines may have mechanical damping design features that reduce both high and low spool rotor natural frequency response in the normal operating speed ranges of the engine so that commanded thrust can be achieved at any point in the operating envelope. The thrust produced is a function of rotor speed, temperature, and fuel flow at various altitudes and flight speeds.

The addition or reduction of rotor speeds by adding of removing power from either or both engine spools mechanically through a motor/generator driven by means of a battery, or electrical power transfer between spools, allows thrust to be maintained at a different thermodynamic match points, thereby moving a rotor resonance point while maintaining the commanded thrust. That is, the power transfer control can provide a shifting of power to or from one or both of the spools in a two-spool system to avoid specific pre-defined rotational speed that may result in rotor dynamics that are adverse to engine operation.

Turbofan engines generally increase rotor speed and temperature to increase thrust. Material temperature and rotor speed both significantly affect the state of material compression or tension. This relationship means that throttle movements required for flight operations can induce an undesirable cyclic stress on certain engine components, requiring design compromises and costly replacements after a certain number of cycles.

Addition of power input or offtake from different spools can change the relationship between temperature, rotor speed, and thrust. During certain flight or operational maneuvers, power can be transferred in such a way as to produce the desired thrust response with a speed and temperature profile that cause a reduction to the induced material tension and compression. Such maneuvers may be referred to herein as "operational stress states," referring to, for example, high stresses acting upon materials of the gas turbine engine, including, but not limited to high or peak stresses (e.g., high or peak compression and high or peak tension). The high or peak stresses may be present, for example, during peak states of change during flight operations. For example, high or even peak compression states may exist during a transition or transient period when transitioning from cruise to descent. Further, high tension states may exist during take-off. These high stress states may life-limit parts, and thus reducing the impact of such events and operation can improve part life and/or reduce maintenance costs. To achieve such avoidance of such operational stress states, power may be added to and/or removed from one or both of the high spool and the low spool. Specifically, in accordance with embodiments of the present disclosure, power can be added to the high spool from the low spool or from an auxiliary power source (e.g., battery) and/or power can be withdrawn from the low spool and store in an auxiliary power source.

The power transfer control and/or the processing system described above are configured to improve or optimize operation of one or both spools of a gas turbine engine to reduce or eliminate operation at operational stress states of operation. Such optimization of operation, and specifically the avoidance of undesirable stress states can reduce or eliminate systems used in engines that may add additional weight and/or to extend part life and thus reduce repairs and replacements of parts.

Figure 4:
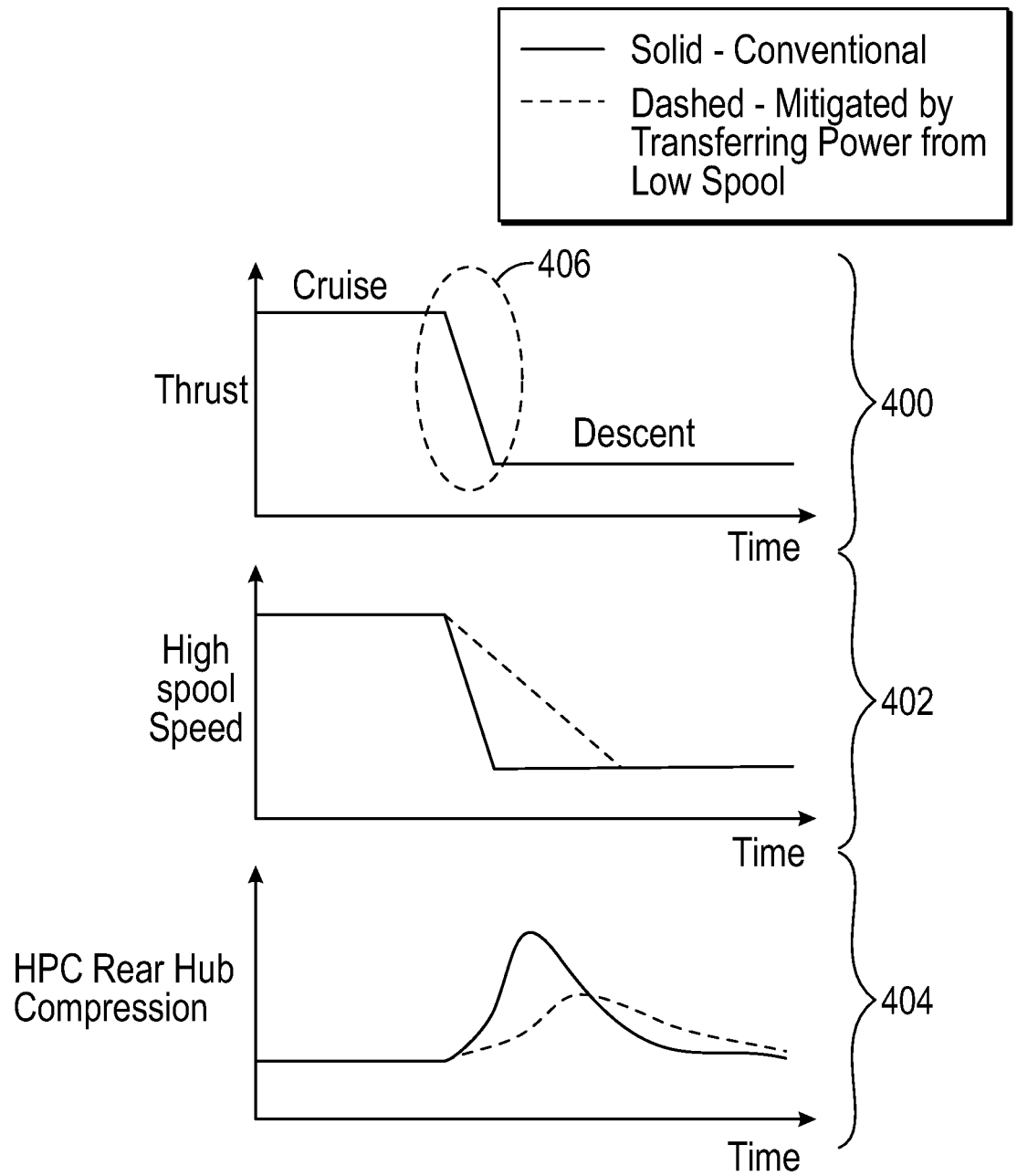
FIG. 4 is set of plots that graphically illustrate a difference between operation of a gas turbine engine in accordance with embodiments of the disclosure and without such feature.

Turning now to FIG. 4, plots 400, 402, 404 schematically illustrating a comparison between an operation without power transfer and operation with power transfer as described above. In each of plots 400, 402, 404 the horizontal axis is time. The vertical axis of plot 400 represents thrust and illustrates one operational stress state 406, specifically the transition from cruise to descent, where the thrust is reduced for descent. In plot 402, the vertical axis is high spool speed, which is also reduced at the transition from cruise to descent. In plot 402 the solid line represents the engine operation without power transfer. The relatively steep slope of the change in high spool speed in plot 402 is a cause of stress, e.g., in the high pressure compressor. This is illustrated in plot 404 by the solid line which represents high pressure compressor rear hub compression during the operational stress state (e.g., the stress—compression—reaches a maximum during the transition). The dashed line, in plots 402, 404 represents the high spool speed and compression when a power transfer is employed. As shown, the high spool speed decelerates more slowly (as shown in plot 402) which results in a lower total stress (as shown in plot 404).

Turning now to FIGS. 5A-5D are plots illustrating various aspects of the present disclosure, as compared to a non-power-transfer configuration. In the plots of FIGS. 5A-5D, the lines labeled 500 (e.g., 500a, 500b, 500c, 500d) represent a non-power-transfer operation of a gas turbine engine, the lines labeled 502 (e.g., 502a, 502b, 502c, 502d) represent operation of a gas turbine engine with power transfer from a low spool to a high spool, and the lines labeled 504 (e.g., 504a, 504b, 504c, 504d) represent a operation of a gas turbine engine with power extraction from a low spool and stored in a battery or other auxiliary power device.

Figure 5A:
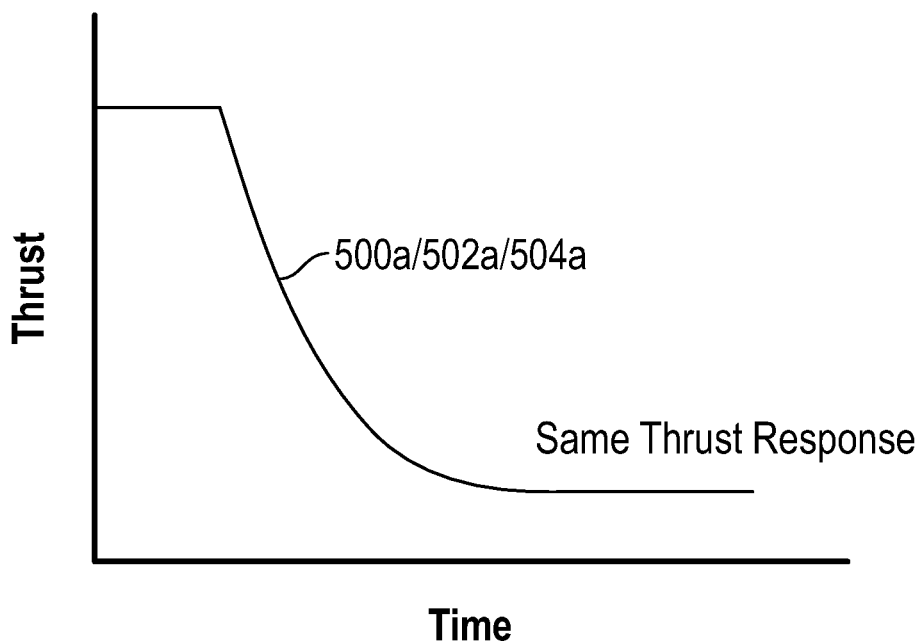
FIG. 5A is a plot of thrust response illustrative of systems with and without embodiments of the present disclosure.

FIG. 5A illustrates that in each state of operation, the thrust response during a transition from cruise to descent (time 180 to about time 200 along the horizontal axis of each plot). That is, employing embodiments of the present disclosure does not impact thrust response, and thus will not impact other aspects of flight or operation of the gas turbine engine.

Figure 5B:
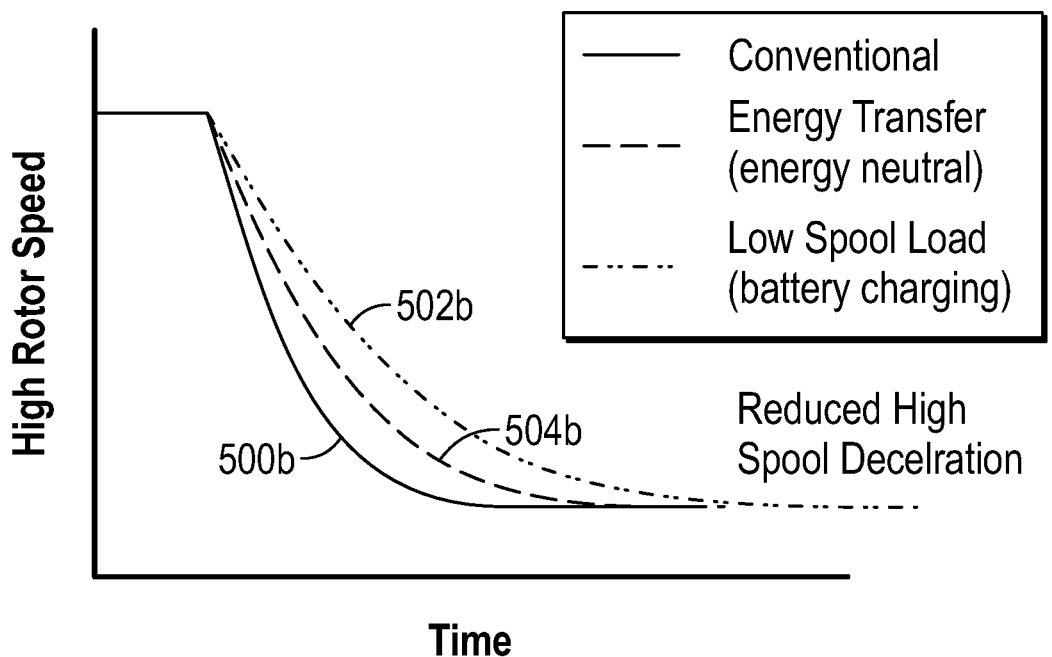
FIG. 5B is a plot of high speed spool deceleration illustrative of systems with and without embodiments of the present disclosure.

FIG. 5B illustrates the improved deceleration achieved by the use of operation in accordance with embodiments of the present disclosure. For example, as shown in FIG. 5B, the rate of deceleration at the cruise-to-descent operational stress state may be at a rate of 230 rpm/s (line 500b). By removing power from the low spool (line 504b) the rate of declaration may be slowed, and by transferring power from the low spool to the high spool (line 504c) the rate of declaration may be slowed even more, such as to a rate of 140 rpm/s. This slowed deceleration reduces the stress experienced by parts of the gas turbine engine, and thus part life may be extended.

Figure 5C:
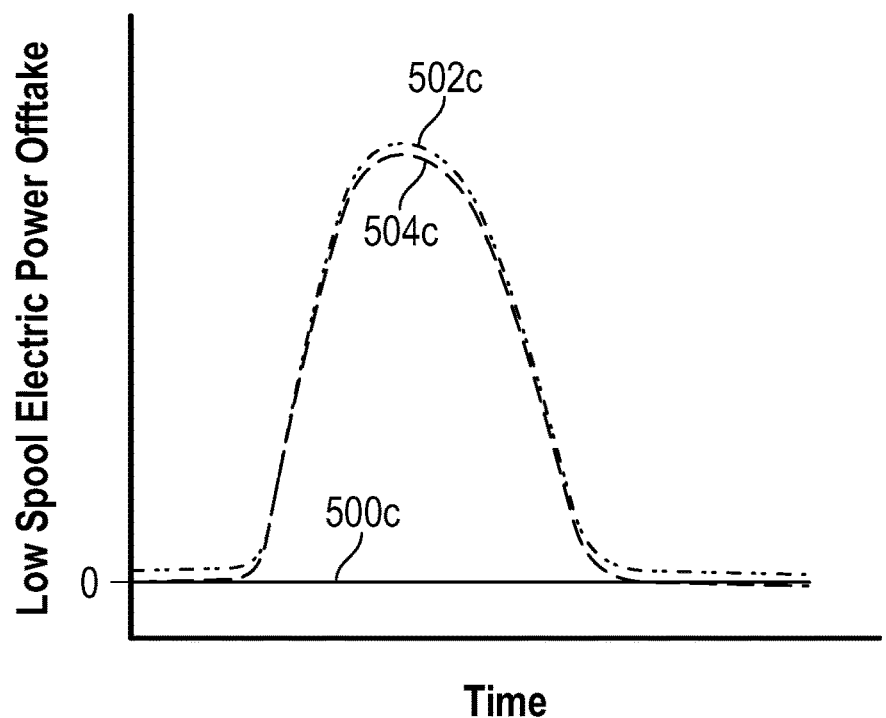
FIG. 5C is a plot of low speed spool power offtake illustrative of systems with and without embodiments of the present disclosure.

FIG. 5C illustrates power offtake from the low spool. That is, FIG. 5C illustrates power removed from the low spool, during an operational stress state of operation, for a gas turbine engine. Line 500c illustrates that no power is pulled from the low spool in a traditional configuration. Lines 502c, 504c illustrate that power is extracted from the low spool, either to be used to charge a battery or other auxiliary power source (line 504c) or to be transferred to the high spool (502c).

Figure 5D:
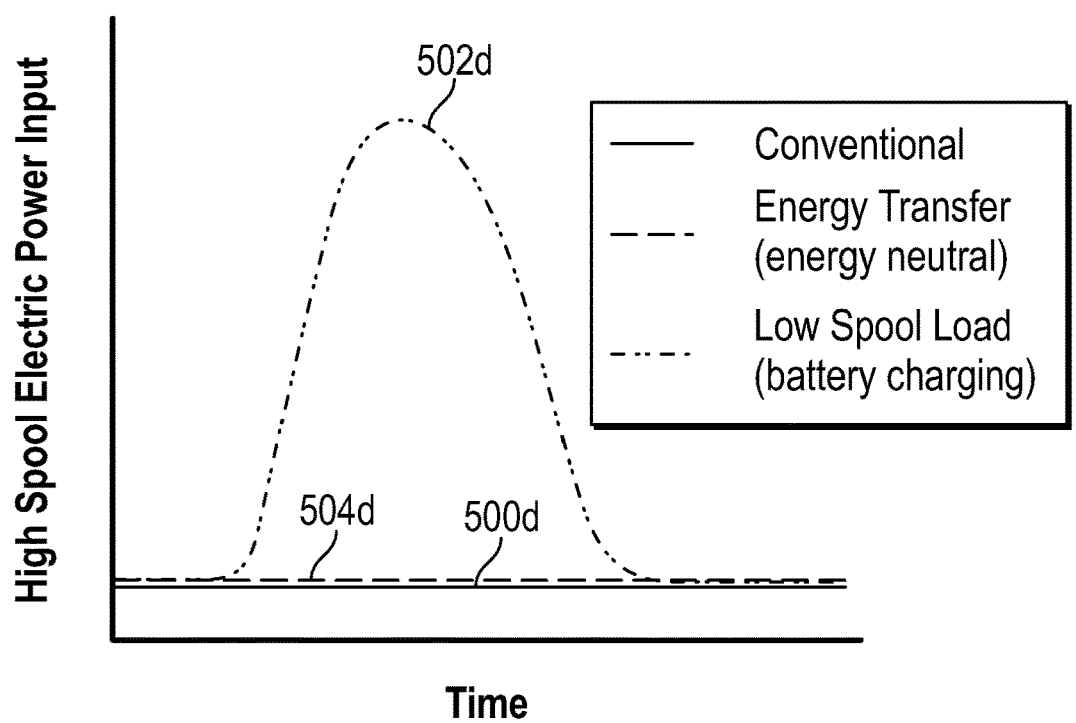
FIG. 5D is a plot of high speed spool power offtake illustrative of systems with and without embodiments of the present disclosure.

FIG. 5D illustrates power offtake from the high spool. That is, FIG. 5D illustrates power removed from the high spool, during an operational stress state of operation, for a gas turbine engine. Line 500d illustrates that no power is pulled from (or added to) the high spool in a traditional configuration. FIG. 5D illustrates that in the power transfer state from low spool to high spool (line 502d) the high spool receives power (e.g., that substantially matches the power offtake of the low spool, line 502c). Because FIG. 5D is a power offtake from the high spool, the negative value of power is indicative of a power transfer to the high spool. In the case of transferring power from the low spool to an auxiliary power source (line 504d), no (or reduced) power is transferred to the high spool. It is noted that lines 504a, 504b may be substantially similar to that shown in FIGS. 5A-5B if power is transferred to the high spool from an auxiliary power source, and no power is extracted from the low spool. In such a case, the line of such configuration on the plot of FIG. 5C would be zero for the full extent (no power is transferred to or taken from the low spool), but the power transferred to the high spool may be similar to line 502d shown in FIG. 5D.

Although the above described illustrations are employed with an example of a cruise-to-descent operational stress state transition, applications of the present disclosure may be used during other operational stress states, such as during takeoff (e.g., a peak tension stress state).

Transfer of power form one spool to another (or the extraction or addition of power to a spool) to achieve a desired effect may be achieved in accordance with embodiments of the present disclosure. In some embodiments, a clutch configuration or other mechanical power transmission configuration, as described above, may be arranged to extract rotational energy from at least one of the high speed spool and/or the low speed spool and/or adding rotational energy to at least one of the high speed spool and/or the low speed spool. By removing or adding power (e.g., rotational energy) from/to a spool, the deceleration of the high spool may be reduced. As such, operational stress states may be reduced or avoided.

Embodiments of the present disclosure may provide for various power transmission, power extraction, and/or power addition, to one or more spools of a gas turbine engine. For example, low speed spool power extraction may be performed to cause a slower deceleration rate of a high spool during an operational stress state while maintaining commanded thrust. Further, as another example, high speed spool power addition may be performed to cause a slower deceleration rate of a high spool during an operational stress state while maintaining commanded thrust. As another example, low speed spool-to-high speed spool power transfer may be performed to cause a slower deceleration rate of a high spool during an operational stress state while maintaining commanded thrust.

The terms "about" and "substantially" are intended to include the degree of error associated with measurement of the particular quantity based upon the equipment available at the time of filing the application. The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hybrid electric propulsion system, comprising:
   a gas turbine engine including a low speed spool and a high speed spool, the low speed spool including a low pressure compressor and a low pressure turbine, and the high speed spool including a high pressure compressor and a high pressure turbine;
   a mechanical power transmission configured to at least one of extract power from and supply power to at least one of the low speed spool and the high speed spool;
   an electric motor configured to augment rotational power of at least one of the low speed spool and the high speed spool; and
   a controller configured to control a power augmentation of at least one of the low speed spool and the high speed spool during a material stress state of operation of the gas turbine engine, wherein the power augmentation comprises reducing a deceleration of the high speed spool while maintaining a commanded thrust reduction by one of:
   (i) extracting power from the low speed spool, (ii) adding power to the high speed spool, and (iii) transferring power from the low speed spool to the high speed spool.

2. The hybrid electric propulsion system of claim 1, wherein the material stress state includes a peak compression state.

3. The hybrid electric propulsion system of claim 2, wherein the peak compression state occurs during a transition from cruise to descent.

4. The hybrid electric propulsion system of claim 1, wherein the material stress state includes a peak tension state.

5. The hybrid electric propulsion system of claim 4, wherein the peak tension occurs during takeoff.

6. The hybrid electric propulsion system of claim 1, further comprising an auxiliary power source configured to store energy extracted from the low speed spool.

7. The hybrid electric propulsion system of claim 1, wherein the control of the power augmentation further includes an operation of adding power to the high speed spool from an auxiliary power source.

8. The hybrid electric propulsion system of claim 1, further comprising at least one mechanical power transmission configured to add power to the high speed spool.

9. The hybrid electric propulsion system of claim 1, further comprising at least one mechanical power transmission configured to extract of power from the low speed spool and add power to the high speed spool.

10. A method for controlling a hybrid electric propulsion system, the method comprising:
    monitoring, by a controller, operation of a gas turbine engine, the gas turbine engine including a low speed spool and a high speed spool, the low speed spool including a low pressure compressor and a low pressure turbine, and the high speed spool including a high pressure compressor and a high pressure turbine;
    determining, by the controller and based on the monitored operation of the gas turbine engine, that a material stress state is occurring; and
    controlling, by the controller, a power augmentation of at least one of the low speed spool and the high speed spool during the material stress state of operation of the gas turbine engine, wherein the power augmentation comprises reducing a deceleration of the high speed spool while maintaining a commanded thrust reduction by one of:
    (i) extracting power from the low speed spool, (ii) adding power to the high speed spool, and (iii) transferring power from the low speed spool to the high speed spool.

11. The method of claim 10, wherein the material stress state is at least one of a high compression state and a high tension state.

12. The method of claim 11, wherein the controller is configured to at least one of determine the high compression state is occurring during a transition from cruise to descent and determine the high tension state is occurring during takeoff.

13. The method of claim 10, further comprising storing energy extracted from the low speed spool in an auxiliary power source.

14. The method of claim 13, wherein the control of the power augmentation includes adding power to the high speed spool from the auxiliary power source.

15. The method of claim 10, further comprising at least one mechanical power transmission configured to add power to the high speed spool.

16. The method of claim 10, further comprising at least one mechanical power transmission configured to extract of power from the low speed spool and add power to the high speed spool.

* * * * *